United States Patent [19]
Mosetti et al.

[11] 3,972,729
[45] Aug. 3, 1976

[54] METHOD OF PRODUCING ELECTRODES

[75] Inventors: Jacques Mosetti; Klaus D. Beccu; Pierre Jonville, all of Geneva, Switzerland

[73] Assignee: Centre National d'Etudes Spatiales, Paris, France

[22] Filed: Nov. 24, 1975

[21] Appl. No.: 634,525

Related U.S. Application Data

[63] Continuation of Ser. No. 433,671, Jan. 16, 1974, abandoned, which is a continuation-in-part of Ser. No. 232,762, March 8, 1972, abandoned.

[30] Foreign Application Priority Data
June 30, 1971  Switzerland.......................... 9587/71

[52] U.S. Cl................................ 136/75; 136/120 R
[51] Int. Cl.$^2$......................................... H01M 35/18
[58] Field of Search .................. 136/75, 76, 20, 23, 136/24, 28, 29, 120 R; 75/208. R, 226

[56] References Cited
UNITED STATES PATENTS 731,308   6/1903   Jungner ............................ 136/76 X
3,184,339   5/1965   Ellis ...................................... 136/75

*Primary Examiner*—Anthony Skapars
*Attorney, Agent, or Firm*—Karl F. Ross; Herbert Dubno

[57] ABSTRACT

Electrodes for primary and secondary batteries are produced by mixing a comminuted active compound with a comminuted metallic support material and then sintering the mixture under a pressure sufficient to allow the metallic particles to cohere in a temperature range of thermal stability of the active compound. The metallic support materials here specifically considered include nickel, silver, zinc and copper. The active materials include nickel fluoride, copper fluoride, silver sulfate and mercuric oxide in the case of positive electrodes as well as cadmium fluoride, zinc oxide, zinc sulfate and zinc phosphate in the case of negative electrodes.

3 Claims, No Drawings

METHOD OF PRODUCING ELECTRODES

CROSS-REFERENCE TO RELATED APPLICATION

This is a continuation of application Ser. No. 433,671 filed Jan. 16, 1974 now abandoned, and which in turn is a continuation-in-part of our copending application Ser. No. 232,762 filed 8 March 1972, now abandoned.

FIELD OF INVENTION

Our present invention relates to a method of producing electrodes for th cells of primary and secondary batteries.

BACKGROUND OF THE INVENTION

Various conventional methods of producing electrodes for alkaline storage batteries entail the preparation of an electrode support in the form of a porous sintered plate which is subsequently impregnated with an electrochemically active material. Thus, for example, it is known to impregnate a sintered nickel plate with a cadmium or nickel salt and to hydrolyze the salt in a strongly alkaline medium, followed by washing and drying. This cycle of operations must generally be repeated several times to permit a sufficient quantity of the active material to be incorporated in the support, rendering this method lengthy, complicated and expensive. Further, it is difficult to obtain a good reproducibility of the quantities of active material which are incorporated in the electrodes by impregnation. Moreover, the impregnating method causes a relatively high corrosion of the porous nickel support, due to the acid nitrates generally employed for impregnating, whereby the mechanical strength of the support is considerably weakened with consequent reduction of the useful life of the electrodes produced in this manner. Furthermore, the use of highly porous metal supports which are obtained by, for example, free sintering of a nickel powder does not permit maximum utilization of the active mass, particularly with nickel electrodes. This disadvantageous effect is due to a bad random distribution of the medium size of the pores or interstices produced by the sintering process.

In fact, in such sintered structures there is generally present a high proportion of large pores (having a size of 100 microns or more) as well as a considerable proportion of very fine pores (having a size of less than 0.01 micron) and of closed pores. The presence of pores having a size of more than a few tens of microns results in poor electric contact between the active mass and the metal support; on the other hand, when there are too many excessively fine pores (of a size of less than 0.1 micron), most of them completely or partly closed, these pores are not properly filled with the active mass and are insufficiently utilized as it is difficult for the electrolyte to enter these pores.

It is also known to impregnate the porous support electrochemically with a hydroxide in a single operation which must take a relatively long time to permit sufficient penetration of the hydroxide, e.g. cadmium or nickel hydroxide, into the porous support. However, such electrochemical impregnation produces an irregular distribution of the active mass in the electrode, which is highly undesirable, the concentration of the active mass being much greater near the surface than in the interior of the electrode body.

To overcome the disadvantages of the impregnating methods referred to above, it has already been proposed to produce a cadmium electrode in a single operation by subjecting a powder mixture of nickel and cadmium oxide to free sintering in a neutral atmosphere at a temperature sufficient to permit sintering of the nickel at ambient pressure. However, in the range between 700° and 900°C, at which this sintering is carried out, the cadmium oxide tends to sublime, resulting in an appreciable loss of active mass, the amount of sublimed cadmium oxide being a function of the duration and temperature of the sintering operation. Therefore, such free sintering of the nickel of the support in the presence of cadmium oxide, although relatively simple, generally does not yield electrode capacities as high as those obtained with the conventional electrodes referred to above in which the active mass is incorporated in the electrode by impregnation of the sintered support.

It has also been proposed to produce electrodes for storage batteries merely by pressing a powdered active mass which may be mixed with a metallic support powder. To ensure efficient cohesion of the powder particles, and thus a high mechanical strength of the electrode, very high pressures on the order of 700 to 1400 kg/cm$^2$ are required. By this procedure, however, the powder particles are closely compacted, causing an undesirable reduction of the final porosity of the electrode and insufficient mechanical stability of the electrode in operation.

To improve the mechanical strength of the pressed electrode body thus obtained, it has also already been proposed to subject it to sintering. However, this greatly limits the number of available combinations of active mass and support material. In fact, the sintering temperature of the support material is generally not very different from the decomposition temperature of the active mass of the electrode and therefore it is difficult to obtain satisfactory sintering without decomposition and/or volatilization of the active mass.

It has also been proposed to agglomerate particles of active material by sintering and to bind the sintered mass thus obtained to a support material by the application of pressure and heat. However, it is obvious that, because of the often very different nature of the active mass and that of the support material, the number of available combinations of active mass and support material to be sintered according to this method is likewise very limited. Moreover, it is difficult to obtain by this method a high mechanical strength and conductivity simultaneously with a satisfactory capacity.

Further, a sintered electrode is known which is made of silver grains as the active mass and nickel grains as the support material. Sintering of this electrode is effected in a reducing atmosphere at a temperature between 700° and 900°C; the silver grains may be obtained by decomposition of silver oxide particles during the sintering operation. To facilitate bonding between the grains it has also been proposed to subject the starting mixture during sintering to light compression with a pressure on the order of one kilogram per square centimeter. However, this method is essentially suitable only for producing an electrode having an active mass of silver, and its range of sintering temperatures cannot be utilized for producing other types of electrodes in which the active mass would decompose at such temperatures.

In addition, a cobalt electrode has been proposed in which cobalt is used for the active mass as well as for the support material. For producing such an electrode a method is used which consists of hot pressing a powder mixture of metallic cobalt and filling material which is subsequently removed to form pores in a sintered cobalt structure. This hot pressing is designed to affect sintering at a temperature such that the filling material will not chemically attack the cobalt powder and is not itself chemically attacked not undergoes a change of state during sintering. Thus, this method affords certain advantages but only in the production of cobalt electrodes. This type of negative electrode has, however, some limitations due to a progressive dissolution of $Co(OH)_2$ in an alkaline medium and therefore does not strictly meet the requirements of a long electrode life with a predetermined capacity.

OBJECT OF THE INVENTION

It is the object of our present invention to provide a simple and easily reproducible method of producing battery-cell electrodes which may have various types of active masses and have a high specific capacity as well as good mechanical strength so that the disadvantages and limitations described above are largely eliminated.

SUMMARY OF THE INVENTION

Our improved method of producing such electrodes, made of an electrochemically active material and a conductive support material, comprises the steps of mixing a comminuted active compound, capable of participating in the energy-generating process directly or after chemical or electrochemical transformation, with a substantial proportion of a comminuted metallic support material designed to form a conductive skeleton i.e. a porous but coherent electrode body, permeated by the active compound. The resulting powder mixture is then sintered in a hot pressing operation, with or without prepressing, to produce an electrode body of the desired shape under a pressure sufficient to cause cohesion of the metallic particles at a temperature below the melting point of the metal at which the active compound is thermally stable, i.e. does not undergo transformation or volatilization.

There are a great number of metallic compounds which may serve as the electrochemically active compound within the definition given above. However, this compund must simultaneously satisfy a number of additional conditions.

For example, the melting point and the temperature of decomposition or volatilization of the compound, such as a salt, oxide, hydroxide or alloy of various metals, must be well above the temperature at which sintering under pressure is carried out.

Further, this compound must not be hygroscopic and should be easily dehydratable if it normally occurs in the form of a hydrated compound containing some molecules of water.

In accordance with the foregoing definition, this compound must either act directly as the electrochemically active electrode component i.e. an electrolytically reducible or oxidizable mass or be easily convertible into such component by the action of an alkaline electrolyte (e.g. 6N KCH). Further, during its conversion into hydroxide the compound must not release anions which would interfere with efficient operation of the storage battery (e.g. sulfide anions).

Compounds which for one or more of the above-mentioned reasons cannot be used include the following:

Metal sulfides such as Nis which cause poisoning of the electrodes; compounds such as nickel oxide NiO or cadmium sulfide CdS which are not convertible into the corresponding metal hydroxides; nickel nitrate $Ni(NO_3)_2$ which is hygroscopic; cadmium nitrate $Cd(NO_3)_2$ because its melting point is too low (350°C); and nickel formiate $Ni(HCO_2)_2$ because it has insufficient thermal stability.

As to the sintering conditions such as temperature, pressure and duration of sintering, they vary in accordance with the materials used and have different optimum values in each individual case. The sintering temperatures generally are in the range substantially 300° and 700°C, the preferred range in most cases being between 500° and 600°C. The accompanying pressures are in the range between substantially 100 and 2000 kg/cm$^2$, the preferred range being between 250 and 750 kg/cm$^2$. The duration of sintering is between 0.5 and 30 minutes, the preferred range being between 2 and 8 minutes.

The simultaneous use of temperature and pressure enables accurate sintering at a reduced temperature, and this permits the selection of a wide variety of starting materials for each individual case. Further, this relatively simple method affords a better reproducibility and consequently greater reliability of the produced electrodes. In fact, any desired composition of the starting mixture may be precisely preselected and will remain unchanged during the hot-pressing operation under exactly predetermined conditions.

The electrodes produced by this method have a very smooth surface, high rigidity and a very regular random distribution of the pore sizes in the interior of their porous body.

SPECIFIC DESCRIPTION

Representative examples for carrying out the method according to our invention will now be described in detail.

EXAMPLE 1

A positive nickel electrode is produced in the following manner: nickel powder such as nickel Mond 255 is used as a support material whereas anhydrous nickel fluoride is used as the active compound.

The anhydrous $NiF_2$ is obtained by treatment of $NiF_2 \cdot 4H_2O$ in air at 250°C in a desiccator for 16 hours. Thereby a substantially anhydrous product is obtained which contains only a few percent of water. Then an intimate mixture of the nickel powder and this nickel fluoride powder is prepared with a weight ratio of Ni : $NiF_2$ of 56 : 44. With a blender such intimate mixture can be obtained within a few minutes.

A shaping of the powder mixture is then carried out in a flat rectangular steel mold having inside dimensions of 4 × 3.5 cm. For this purpose 2.5 g of the powder mixture is first uniformly spread over the bottom of the mold and cold-pressed in air with a pressure of 100 kg/cm$^2$ to form a first powder bed. Placed on this bed is a nickel grid which may be formed by a net of pure nickel wire of a diameter of 0.224 mm and with a mesh size of 0.5 mm. The wire net may also have closer meshes and may be made of thinner wire, e.g. with a wire mesh of 80 microns for a wire diameter of 50 microns, so that it will be of lighter weight, or expanded metal or perforated sheet metal may be used instead of the wire net. Then this grid is covered with a uniform layer of the powder mixture, using 2.5 g thereof, which is also cold-pressed in air under a pressure of 100 kg/cm² to form a second compact powder bed.

Shaping of the powder mixture may also be effected by depositing that mixture by means of a spray gun on a metal supporting net after forming a suspension of the powder mixture in a volatile solvent such as acetone in which also a small percentage of a plastic binder such as methyl polymethacrylate or polystyrene is dissolved.

Then the electrode is sintered by hot-pressing for two minutes in an argon atmosphere under a pressure of 500 kg/cm² and at a temperature of 550°C. The hot-pressing operation may be carried out either in a press provided with heated platens or directly in the mold which has been used for shaping the electrode. The electrode thus obtained is rigid and has a flat shape with a thickness of about 1 mm, an overall porosity of 52% and high mechanical strength.

When this electrode is immersed into an alkaline electrolyte such as 6N potash (KOH), the following reaction will take place spontaneously:

$$NiF_2 + 2 KOH \rightarrow Ni(OH)_2 + 2 KF$$

When this electrode is charged in an alkaline electrolyte for 10 hours by a current of 100 mA the following complete chemical reaction takes place:

$$Ni(OH)_2 + OH^- \rightarrow NiCCH + e^- + H_2O$$

The electrode thus charged may be subjected to a series of charging and discharging cycles. After about five such cycles with a discharging depth of 100% and a discharging time of three hours the electrode reaches its maximum capacity. After these formation cycles the electrode may be washed with distilled water to remove the fluoride ions formed by the conversion of nickel fluoride $NiF_2$ into nickel hydroxide $Ni(CH)_2$. However, such washing may also be dispensed with as it has been established by tests that the fluoride ions generally do not cause any damage with respect to either corrosion of the metallic support material or the efficiency of the electrochemically active material. Thus, the electrode may be mounted in the storage battery before starting its electrochemical formation.

After 500 charging and discharging cycles at the rate C/3 the specific capacity of the electrode is still constant at 122 Ah per kg of the initial powder mixture. This compares favorably with conventional commercially obtainable sinter-plate nickel electrodes. This result is mainly due to a better distribution of the active mass within the electrode obtained by the hot-pressing operation and therefore the active mass has a greater electrochemical efficiency. The improved performance is also due to the fact that the random distribution of the medium pore diameter, as determined by a mercury porosity meter, is more concentrated about a mean value between $0.3\mu$ and a few microns, which tends to increase the efficiency of the active mass, and to the fact that the electrode does not have any closed pores.

The weight ratio between Ni and $NiF_2$ in the powder mixture may be increased to 65 : 35. Although this causes a reduction of the specific capacity of the electrode from 122 Ah/kg to 97 Ah/kg, such an increase in the percentage of nickel in the powder mixture used for producing the electrode yields compensating advantages. Thus, for example, the mechanical strength and the electronic conductivity of the electrode are improved and the electrode so produced may be discharged more rapidly. Moreover, in this case a useful life of the electrode of 1500 charging and discharging cycles at the rate C/3 has been achieved without any noticeable deterioration of the electrode or loss of its capacity although rather severe testing conditions were applied (discharging depths of 100% and heavy overcharges).

EXAMPLE 2

A positive nickel electrode is produced as described in Example 1 except that the powder mixture is formed of 56% by weight of nickel powder (nickel Mond 255), 40% of $NiF_2$ and 4% of $CoF_2$.

During the initial charging of the electrode the $CoF_2$ is converted into hydroxide simultaneously with the $NiF_2$ and improves the charge-receiving ability of the electrode.

The capacity of the electrode thus produced is substantially the same as that of the electrode produced according to Example 1.

EXAMPLE 3

A negative cadmium electrode is produced by using as starting materials nickel powder (for example, nickel Mond 255) to form the skeleton of the electrode body, and the anhydrous cadmium fluoride as the active compound. The anhydrous $CdF_2$ used in this case is a product sifted to a grain size of $33\mu$ and commercially available.

A powder mixture composed of nickel and cadmium fluoride in a weight ratio of 47 : 53 is prepared. Then the powder mixture is shaped and sintered by hot-pressing as described in Example 1.

When the electrode thus produced is immersed in an alkaline electrolyte (for example, 6N KCH) the cadmium fluoride is spontaneously converted into cadmium hydroxide. When the electrode is then subjected to its regular operating cycle in an alkaline electrolyte of a storage battery, beginning, for example, with a charge at the rate of C/4, all the hydroxide is reduced to metallic cadmium.

The charged negative electrode has a theoretical specific capacity of 218 Ah per kg of the Ni/$CdF_2$ mixture. At the thirtieth cycle of charging and discharging this electrode has an effective specific capacity of 87 Ah per kg of the mixture which corresponds to a yield of 40%.

EXAMPLE 4

A negative cadmium electrode is prepared as described in Example 3 with incorporation of an additive in the powder mixture before it is hot-pressed. Thus, for example, powdery $Fe_2O_3$ may be added by simple mixing to obtain a powder mixture of the following composition in weight percent:

47% Ni
50% $CdF_2$
3% $Fe_2O_3$

Such addition considerably improves the capacity of the electrode and helps stabilize its working cycles. In effect, the theoretical capacity of this electrode is 213 Ah/kg whereas its effective capacity at the thirtieth cycle of charging and discharging is 140 Ah/Kg, which corresponds to a yield of 66%.

The same result can be obtained by incorporating various other additives in the powder mixture. Thus, instead of $Fe_2O_3$, for example, an additive such as $TiO_2$ may be used with the same percentages.

EXAMPLE 5

A negative cadmium electrode is prepared as described in Example 3 but using $KCdF_3$ instead of $CdF_2$ for the active compound.

The $KCdF_3$ is prepared in the following manner: An equimolecular mixture of powdery potassium fluoride and powdery cadmium fluoride is cold-pressed under a pressure of 8 $T/cm^2$ and then subjected to a thermal diffusion treatment in an inert atmosphere (nitrogen) at 600°C for 3 hours. The resulting product is ground, again cold-pressed and once more subjected to the same treatment.

The final product ($KCdF_3$) is ground, sifted to a particle size of less than $50\mu$ and used to produce a negative electrode as described in Example 3.

During conversion of the $KCdF_3$ in the alkaline electrolyte the KF is eliminated by dissolution and the resulting electrode has an increased porosity which improves the electrochemical operation of the electrode and its faradaic efficiency (up to 75% after 100 cycles of charging and discharging).

EXAMPLE 6

An antimagnetic cadmium electrode which may be used, for example, in space-flight applications is produced by using only antimagnetic materials.

A powder mixture is prepared from silver as the support material, $KCdF_3$ (as in Example 5) as the active compound, and titanium dioxide (rutile) as an additive. This mixture has the following composition in weight percent:

45% Ag
52% $KCdF_3$
3% $TiO_2$

The powder mixture is shaped and sintered by hot-pressing in the same manner as described in Example 1. However, the grid serving as a current collector is made of copper or silver in this case and sintering by hot-pressing is effected in an argon atmosphere for 5 minutes at a temperature of 500°C and under a pressure of 250 $kg/cm^2$.

Instead of silver, metallic copper may be used as the support material with the same percentages and under the same conditions as described above. The faradaic efficiency is the same in both cases, i.e. 75%.

EXAMPLE 7

A bipolar electrode designed to form two adjacent half-cells in an alkaline storage battery, and comprising a negative cadmium electrode connected through the intermediary of a nickel plate to a positive nickel electrode, is produced in the following manner:

To form the negative electrode, a liquid mixture of the following composition in weight percent is prepared:

15% nickel powder (nickel Mond 255)
16% $CdF_2$ powder
1% $Fe_2O_3$ powder
67.5% acetone as a solvent
0.5% polystyrene powder as a binder.

To form the positive electrode, a liquid mixture of the following composition in weight percent is prepared:

18% nickel powder (Nickel Mond 255)
13% $NiF_2$ powder
1% $CoF_2$ powder
67.5% acetone as a solvent
0.5% polystyrene powder as a binder.

Each of these two mixtures is then applied, e.g. by spraying, to one of the two surfaces of a nickel plate 5 × 6 cm in size to form two coatings thereon each of a thickness of 2 mm.

The nickel plate thus coated on both sides is then subjected to hot-pressing in an argon atmosphere in a press provided with heated platens under a pressure of 500 $kg/cm^2$ and at a temperature of 550°C. This hot-pressing operation lasts for two minutes and is followed by rapid cooling in an argon atmosphere to provide a rigid bipolar electrode formed by the nickel plate provided on both sides with a layer of sintered material having an overall porosity of 52% and a thickness of 1 mm.

Shaping and hot-pressing of the bipolar electrode may also be carried out in a steel mold of appropriate design.

EXAMPLE 8

To produce a positive silver electrode, a powder mixture of the following composition in weight percent is prepared:

| | |
|---|---|
| metallic silver powder of particle size less than 33 microns | 50% |
| silver sulfate powder of particle size less than 50 microns | 50% |

The silver powder serves to form a sintered skeleton designed to impart to the electrode the conductivity and mechanical strength required for its operation. Also a portion of this support material is adapted to be electrochemically activated and adds to the overall capacity of the electrode. The silver sulfate constitutes the electrochemically active material of the electrode in the discharged state; this compound is reduced to metallic silver by an electrochemical reaction which may be effected, for example, just before utilizing the electrode to supply current in an alkaline silver-zinc or silver-cadmium storage battery. Further, the reduction of the silver sulfate to metallic silver imparts to the electrode the desired porosity.

Then the electrode is shaped by hot-pressing of this powder mixture in a mold of appropriate shape after a metal grid, formed preferably from expanded sheet silver, has been placed between two beds of the powder mixture. After pressing for 5 minutes at a temperature of 400°C and under a pressure of 250 $kg/cm^2$ in ambient atmosphere (i.e. in air), an electrode is produced which has a good mechanical strength and a porosity of 52% upon electrochemical reduction of the silver sulfate. When subjected to a cycle of operation in 6N potash this electrode provides a faradaic efficiency of 54% as calculated by the total amount of silver which it contains, i.e. its specific capacity is 268 Ah/kg.

EXAMPLE 9

To produce a negative zinc electrode, a powder mixture of the following composition in weight percent is prepared:

| | |
|---|---|
| metallic zinc powder | 40% |
| zinc oxide powder | 55% |
| mercuric oxide powder | 4% |
| ammonium chloride | 1% |

These powders have a grain size of about 33 $\mu$. The metallic zinc powder serves to provide a sintered support which imparts to the electrode the conductivity and mechanical strength required for its operation. The zinc oxide provides the electrochemically active material of the electrode upon charging, the zinc oxide being reduced to metallic zinc by an electrochemical reaction which may be effected, for example, just before utilizing the electrode to supply current in an alkaline storage battery. Further, the zinc oxide permits the electrode to retain a sufficient porosity after sintering.

The mercuric oxide is reduced to metallic mercury when the electrode is charged for the first time, thus permitting amalgamation of the zinc to reduce the extent of self-discharging of the electrode.

Then the powder mixture is cold-pressed in a mold of appropriate form to shape the electrode after a metal grid, preferably of copper, is placed between two layers of the powder mixture. The pressed piece thus obtained is hot-pressed for three minutes at a temperature of 410°C, below the melting point of the zinc (420°C), under a pressure of 300 kg/cm$^2$ in an argon atmosphere. In this manner an agglomeration of the electrode is obtained by sintering of the metallic zinc contained therein, the hot-pressing conditions indicated above permitting the metallic zinc to be slightly melted to ensure satisfactory sintering. During the sintering operation the zinc oxide remains unchanged whereas part of the mercuric oxide is reduced by contact with the metallic zinc. Thus, an amalgamation is initiated which facilitates the melting and mutual bonding between the particles of metallic zinc.

The resulting electrode has an overall porosity of about 52% and excellent electrochemical properties and is ready for use as a negative electrode in a storage battery, for example of the Ag-Zn type.

The hot-pressing operation should be carried out at the optimum sintering temperature which is dependent upon the percentage of metallic zinc present in the particular powder mixture employed. Thus, the powder mixture may contain between 20 and 70% by weight of zinc oxide and the table below indicates with tolerances of about 10°C the best sintering temperatures for the various proportions of the Zn/ZnO/HgO mixtures.

| Composition in % by weight | | | | Sintering temperature °C |
|---|---|---|---|---|
| Zn | ZnO | HgO | NH$_4$Cl | |
| 20 | 75 | 4 | 1 | 500 |
| 30 | 65 | 4 | 1 | 470 |
| 40 | 55 | 4 | 1 | 410 |
| 50 | 45 | 4 | 1 | 380 |
| 60 | 35 | 4 | 1 | 370 |
| 70 | 25 | 4 | 1 | 360 |

As shown by the table, the optimum sintering temperature is the higher the lower is the percentage of metallic zinc in the mixture. When the hot-pressing temperature is much higher than the optimum sintering temperature there is a risk of the zinc being melted too much so as to reduce the porosity of the electrode to an undesired level. On the other hand, when the temperature used for hot-pressing is too low with respect to that optimum temperature, the degree of sintering obtained is insufficient and does not yield an electrode structure of sufficient cohesion and mechanical strength.

EXAMPLE 10

To produce a negative zinc electrode the same method as described in Example 9 is employed except that zinc phosphate $Zn_3(PO_4)_2$ is used instead of zinc oxide. This salt may be prepared by precipitating a zinc salt by an alkaline phosphate. The composition in weight percent of the mixture of Zn, $Zn_3(PO_4)_2$, HgO and NH$_4$Cl is again 40 : 55 : 4 : 1, but the temperature at which hot-pressing is carried out is 415°C while the operating pressure is the same as in the preceding Example.

Also in this case the optimum sintering temperature depends on the composition of the powder mixture used to produce the electrode. The table below indicates the range of proportions which may be used and the optimum sintering temperature for each composition.

| Composition in % by weight | | | | Sintering temperature °C |
|---|---|---|---|---|
| Zn | Zn$_3$(PO$_4$)$_2$ | HgO | NH$_4$Cl | |
| 20 | 75 | 4 | 1 | 440 |
| 30 | 65 | 4 | 1 | 425 |
| 40 | 55 | 4 | 1 | 415 |
| 50 | 45 | 4 | 1 | 400 |
| 60 | 35 | 4 | 1 | 385 |
| 70 | 25 | 4 | 1 | 375 |

The zinc phosphate remains unchanged during sintering by hot-pressing. Then it is converted into hydroxide by hydrolysis in an alkaline medium and the hydroxide is reduced to metallic zinc when the electrode is charged for the first time. The resulting electrode has the same properties as the electrode produced according to the preceding Example.

EXAMPLE 11

A positive electrode containing copper fluoride as the active material is produced in the following manner:

A powder mixture is prepared which contains 60% by weight of powdery CuF$_2$ of a particle size less than 33$\mu$ and 40% by weight of copper powder of a particle size less than 35$\mu$. This mixture is then shaped in a mold in the manner described in Example 1 by incorporating an expanded-metal copper grid as a current collector. Then the electrode is sintered by hot-pressing in a mold at a temperature of 500°C under a pressure of 250 kg/cm$^2$ for five minutes in an argon atmosphere.

In this manner a porous electrode is obtained which is suitable for use as a cathode in a primary cell capable of providing a high power density when discharged in a suitable aqueous electrolyte. When this electrode is immersed, for example, in an ammonium fluoride solution it may be discharged within one hour with a constant voltage which remains very stable; unless the stated conditions a faradaic efficiency of 80% is reached which corresponds to an effective capacity of 250 Ah per kg of the powder mixture.

This electrode may also be immersed into a nonaqueous electrolyte formed, for example, by a lithium perchlorate solution in propylene carbonate. Its potential, as measured relative to that of a metallic lithium electrode, is 43.35 volts which nearly corresponds to the theoretical value of 43.333 volts. In this electrolyte the electrode is also capable of discharging with a high power density in a storage battery.

EXAMPLE 12

For producing a positive electrode containing nickel fluoride as the active material, the method described in Example 1 is employed but with a powder mixture composed of 55% by weight of $NiF_2$ and 45% by weight of nickel.

When the resulting electrode is immersed into a non-aqueous electrolyte formed by a lithium perchlorate solution in propylene carbonate, the potential of the electrode relative to that of a lithium electrode is 2.75 volts whereas its theoretical value 2.82 volts. This electrode also has excellent discharging properties in an electrolyte.

EXAMPLE 13

A positive electrode containing mercuric oxide as the active material is produced in the following manner:

A powder mixture is prepared which has the following composition in weight percent.

| | |
|---|---|
| HgO powder | 80% |
| silver powder (particle size 33µ) | 20% |

After shaping the powder mixture as described in Example 1, using a current collector formed by an expanded-metal silver grid, the electrode body is hot-pressed in a mold in an argon atmosphere at a temperature of 300°C and under a pressure of 250 kg/cm².

The obtained electrode may be immersed into a 6N potash solution and subjected to galvanostatic discharging for a period of 5 hours. During discharging the potential of the electrode remains very stable and in the vicinity of its theoretical value. The electrode has an effective specific capacity of 200 Ah per kg of the powder mixture, which corresponds to a yield of 100%. During the discharging reaction mercury is produced but mercury drops do not appear.

This electrode is particularly suitable for use in primary cells, e.g. in mercury-cadmium cells, which operate at low temperatures and which are required to be capable of discharging with constant voltage while having a long service life.

EXAMPLE 14

For producing an electrode on the basis of HgO a powder mixture is prepared which contains 60% by weight of powdery HgO and 40% by weight of silver powder. The powder mixture is then shaped and hot-pressed as described in Example 13 to provide a porous sintered electrode. In an alkaline electrolyte such as 6N XOH this electrode can be discharged and recharged many times with great depth of discharging and constant voltage during discharging.

This electrode is particularly suitable for use in storage batteries of the mercury-cadmium type which operate at low temperatures and which are required to have a long service life together with a constant voltage during discharging without releasing gases.

As will be apparent from the foregoing description, the method of producing electrodes according to our invention involves only simple and easily reproducible operations while yielding various types of electrodes having a high specific capacity and improved mechanical properties which are required to give the electrode the capability of resisting shocks, accelerations and vibrations of all kinds. Moreover, this method ensures good electronic conductivity of the sintered support and good contact between the support and the active material, thus providing higher efficiency of the electrode. Further, this method permits the production of charged electrodes for primary cells as well as electrodes which can be easily charged in a secondary cell.

The electrodes comprising fluoride and designed to be used in an alkaline electrolyte of a storage battery may also be subjected, before being taken into use, to a separate activation treatment which permits conversion of the entire metal fluoride into the corresponding hydroxide. Thus, after the electrodes have been produced as described above, they may, for example, be stored easily for long periods and this constitutes a further advantage of our method.

The duration of this activation treatment depends on the temperature at which it is carried out. The table below illustrates the considerable influence exerted by the temperature on the time required to completely convert the nickel and cadmium fluorides into the corresponding hydroxides in a mechanically stirred 6N KOH bath.

| Temperature | $NiF_2$ | $CdF_2$ |
|---|---|---|
| 25°C | 20 hrs. | 42 hrs. |
| 30°C | 12 hrs. | 35 hrs. |
| 35°C | 8 hrs. | 30 hrs. |
| 40°C | 5 hrs. | 20 hrs. |
| 45°C | 4 hrs. | 16 hrs. |
| 50°C | 3 hrs. | 8 hrs. |

We claim:

1. A method of producing electrodes for cells of primary or secondary batteries, comprising the steps of:

mixing a comminuted active compound, selected from the group which consists of $NiF_2$, $CdF_2$ and $KCdf_3$, with nickel powder in a proportion sufficient to form upon sintering a porous and coherent metallic body permeated by said active compound; and sintering said nickel powder by subjecting the resulting mixture to a hot-pressing operation at a treatment temperature lying between substantially 300° and 700°C within a range of thermal stability of said active compound and under a pressure, ranging between substantially 100 and 2000 kg/cm², sufficient to cause cohesion of the particles of said nickel powder at said treatment temperature to form said metallic body, thereby preventing any transformation or volatilization of said active compound during said hot-pressing operation.

2. A method as defined in claim 1 wherein said pressure ranges between 250 and 750 kg/cm², said treatment temperature ranging between substantially 500° and 600°C.

3. A method as defined in claim 1 wherein said active compound is nickel fluoride, a minor amount of cobalt fluoride being added to said mixture.

* * * * *